US009602562B2

(12) United States Patent
Kanaya

(10) Patent No.: US 9,602,562 B2
(45) Date of Patent: Mar. 21, 2017

(54) TERMINAL APPARATUS, INFORMATION PROCESSING SYSTEM AND INFORMATION PROCESSING METHOD

(71) Applicant: Mitsuhisa Kanaya, Tokyo (JP)

(72) Inventor: Mitsuhisa Kanaya, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 289 days.

(21) Appl. No.: 14/554,597

(22) Filed: Nov. 26, 2014

(65) Prior Publication Data

US 2015/0156229 A1 Jun. 4, 2015

(30) Foreign Application Priority Data

Nov. 29, 2013 (JP) .................................. 2013-247578
Sep. 30, 2014 (JP) .................................. 2014-201943

(51) Int. Cl.
*G06F 15/16* (2006.01)
*H04L 29/06* (2006.01)
*H04L 29/08* (2006.01)

(52) U.S. Cl.
CPC ........ *H04L 65/403* (2013.01); *H04L 67/2842* (2013.01)

(58) Field of Classification Search
USPC ........................................................ 709/204
See application file for complete search history.

(56) References Cited

U.S. PATENT DOCUMENTS

| 6,573,926 | B1 | 6/2003 | Ichimura |
| 6,801,329 | B1 | 10/2004 | Urabe et al. |
| 7,814,528 | B2 | 10/2010 | Kanaya |
| 2005/0052678 | A1 | 3/2005 | Urabe et al. |
| 2006/0053380 | A1* | 3/2006 | Spataro ............ G06F 17/30011 715/753 |

FOREIGN PATENT DOCUMENTS

JP    2000-023133    1/2000

* cited by examiner

*Primary Examiner* — Hee Soo Kim
(74) *Attorney, Agent, or Firm* — Harness, Dickey & Pierce, P.L.C.

(57) ABSTRACT

A terminal apparatus has a first setting of displaying a portion of information designated by an information processing apparatus and a second setting of being able to display another portion. The terminal apparatus receives transmission information converted from the information by the information processing apparatus to include a portion to be displayed first and transmission information converted from the information to include another portion; stores the transmission information thus received; and displays, in a case of the first setting, the designated portion and displays, in a case of the second setting, a portion based on an operation performed on the terminal apparatus. The terminal apparatus receives, upon switching from the second setting to the first setting, the transmission information corresponding to the designated portion based on whether already receiving the transmission information corresponding to the designated portion.

11 Claims, 14 Drawing Sheets

FIG.6

CLIENT INFORMATION

| CLIENT ID | DIVIDING UNIT | DATA FORMAT | SIZE | CACHE INFORMATION |
|---|---|---|---|---|
| 1 | PAGE BY PAGE | JPEG FORMAT | 1024 × 768 PIXELS | 2 PAGES CACHEABLE ALGORITHM A |
| . . . | . . . | . . . | . . . | . . . |

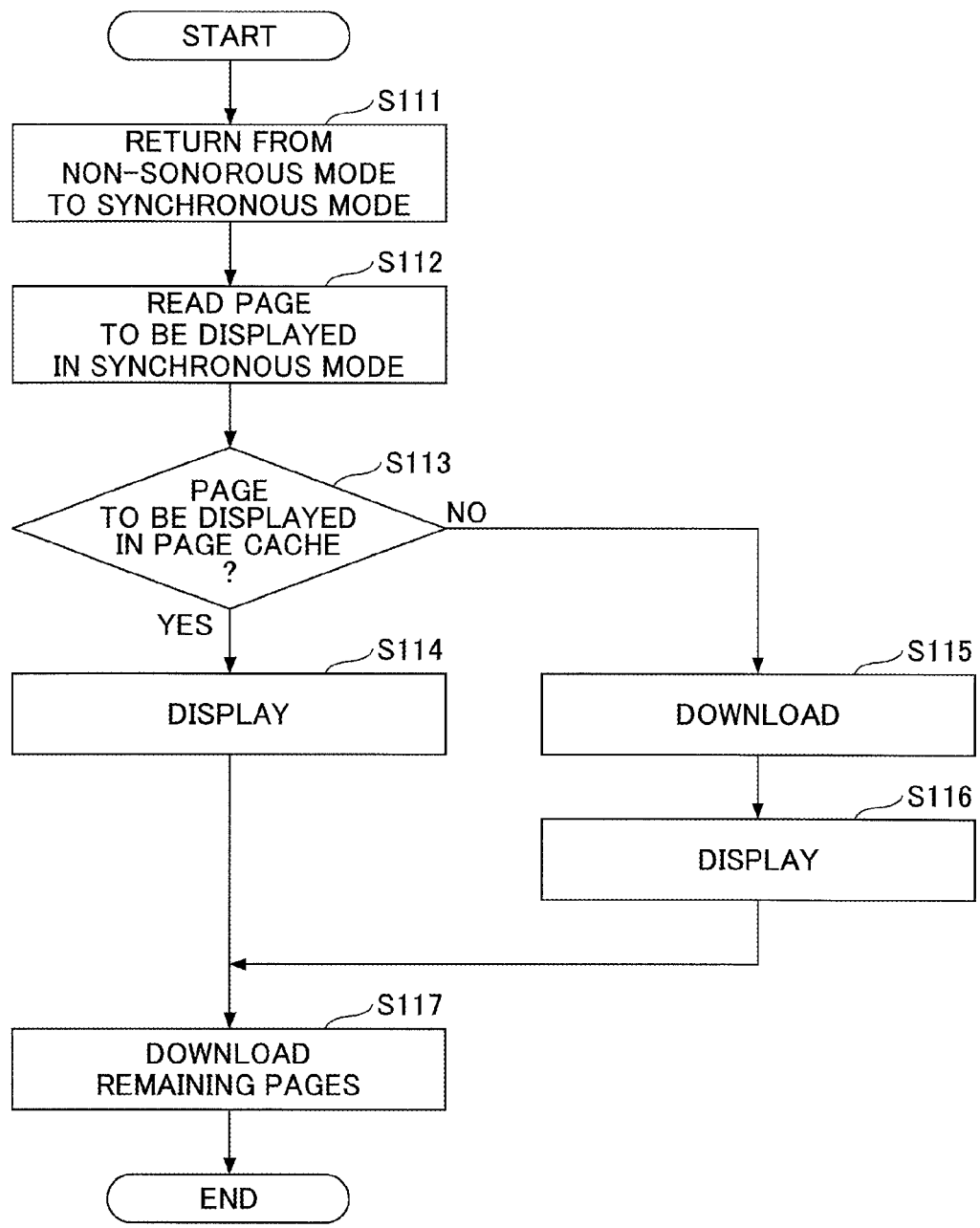

TERMINAL APPARATUS, INFORMATION PROCESSING SYSTEM AND INFORMATION PROCESSING METHOD

BACKGROUND OF THE INVENTION

1. Field of the Invention

The present invention relates to a terminal apparatus, an information processing system and an information processing method.

2. Description of the Related Art

A conference system is known (for example, see Japanese Laid-Open Patent Application No. 2000-23133 (Patent Reference No. 1)) where material data such as a document to be used for a conference is transmitted via a communication line, other than a communication line for transmitting real-time data such as moving-picture data or the like, for transmitting the material data efficiently without adversely affecting transmission of the real-time data or the like.

SUMMARY OF THE INVENTION

According to one aspect of the present invention, a terminal apparatus has a first setting of displaying a portion of information designated by an information processing apparatus and a second setting of being able to display another portion than the portion of the information designated by the information processing apparatus. The terminal apparatus includes a reception part configured to receive transmission information acquired from conversion from the information by the information processing apparatus in such a manner that the transmission information includes a portion of the information to be displayed first and transmission information acquired from conversion from the information by the information processing apparatus in such a manner that the transmission information includes another portion than the portion of the information to be displayed first; a transmission information storage part configured to store the received transmission information including the portion of the information to be displayed first and the received transmission information including the other portion than the portion of the information to be displayed first; and a display process part configured to display, in a case of the first setting, the portion of the information designated by the information processing apparatus and display, in a case of the second setting, a portion of the information based on an operation performed on the terminal apparatus. The reception part is configured to receive, when switching is performed from the second setting to the first setting, the transmission information corresponding to the portion of the information designated by the information processing apparatus based on whether having already received the transmission information corresponding to the portion of the information designated by the information processing apparatus.

Other objects, features and advantages of the present invention will become more apparent from the following detailed description when read in conjunction with the accompanying drawings.

BRIEF DESCRIPTION OF THE DRAWINGS

FIG. 6 is a configuration diagram of one example of client information;

FIG. 14 is a flowchart of one example of a process of a terminal apparatus when switching is performed from the non-synchronous mode to the synchronous mode.

DETAILED DESCRIPTION OF THE EMBODIMENT

An object of the embodiment is to provide a terminal apparatus, an information processing system and an information processing method by which it is possible to implement a setting of temporarily displaying information other than information designated by an information processing apparatus without waiting for a finish of transmission of information from the information processing apparatus to the terminal apparatus.

The embodiment of the present invention will be described in detail. Note that according to the embodiment, a conference system will be described as an example of an information processing system. Conference material is one example of information to be transmitted.

Embodiment

System Configuration

Figure 1:
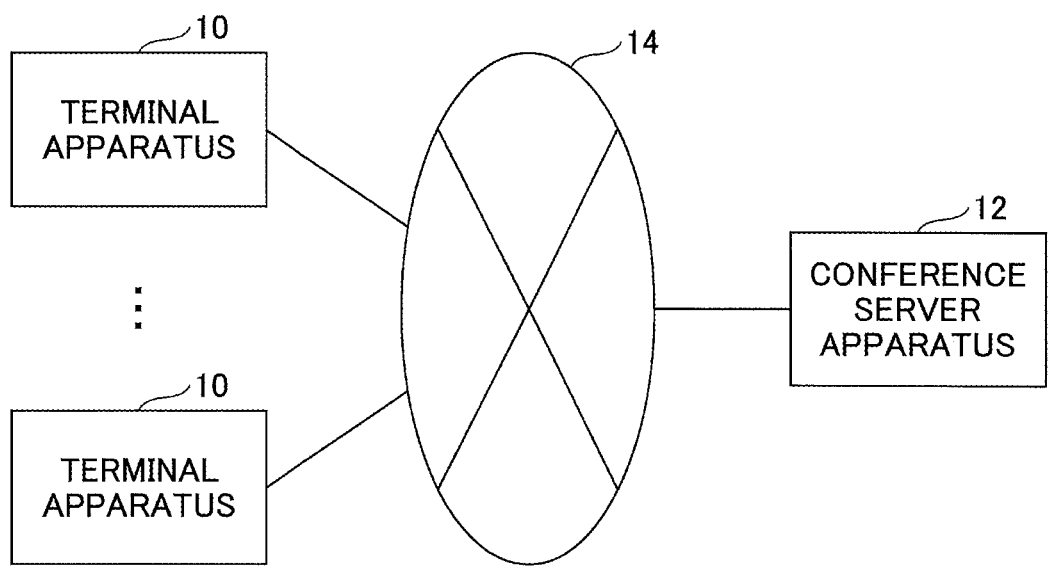
FIG. 1 is a configuration diagram of one example of a conference system according to an embodiment.

FIG. 1 is a configuration diagram of one example of a conference system according to the embodiment. The conference system 1 of FIG. 1 includes one or more terminal apparatuses 10 and a conference server apparatus 12, which are connected to a network 14 in a wired or wireless manner.

Note that the conference server apparatus 12 can be software or a service(s) that operates in a single computer. Further, the conference server apparatus 12 can be software or a service(s) that operates in one or more computers. For example, the conference server apparatus 12 can have a configuration of a so-called "cloud service(s)".

Each terminal apparatus 10 is a device operated by a corresponding participant of a conference. The terminal apparatus 10 can be a Personal Computer (PC), a tablet terminal, a portable information terminal such as a smartphone, a cellular phone or a PDA, a display apparatus such as an electronic whiteboard, a projection apparatus such as a projector, or a terminal dedicated to a conference. A conference application is implemented in the terminal apparatus 10 for receiving (downloading) conference material from the conference server apparatus 12, carrying out a "synchronous display" and a "non-synchronous display" of the conference material, and so forth.

Such a setting in the terminal apparatus 10 that the terminal apparatus 10 carries out a "synchronous display" of conference material is referred to as a synchronous mode. In the synchronous mode, each terminal apparatus 10 participating in the same conference displays the same page of conference material designated by the conference server apparatus 12. Such a setting in the terminal apparatus 10 that the terminal apparatus 10 carries out a "non-synchronous display" of conference material is referred to as a non-synchronous mode. In the non-synchronous mode, even a terminal apparatus 10 participating in the same conference as other terminal apparatuses 10 is capable of temporarily displaying information other than the page of conference material designated by the conference server apparatus 12. The synchronous mode and the non-synchronous mode are called a "sharing mode" and a "personal mode", respectively, or so, in some cases.

The conference server apparatus 12 is an apparatus carrying out information processing concerning a conference. The conference server apparatus 12 transmits conference material to each terminal apparatus 10. Note that the conference server apparatus 12 can be a Work Station (WS), a PC or so. Communication can be carried out between the conference server apparatus 12 and each terminal apparatus 10, for example, through a communication protocol such as a TCP/IP. The conference server apparatus 12 stores registered conference information, user information and so forth. The conference server apparatus 12 stores conference material registered (uploaded) from the terminal apparatuses 10, or so.

<Hardware Configuration>

Figure 2:
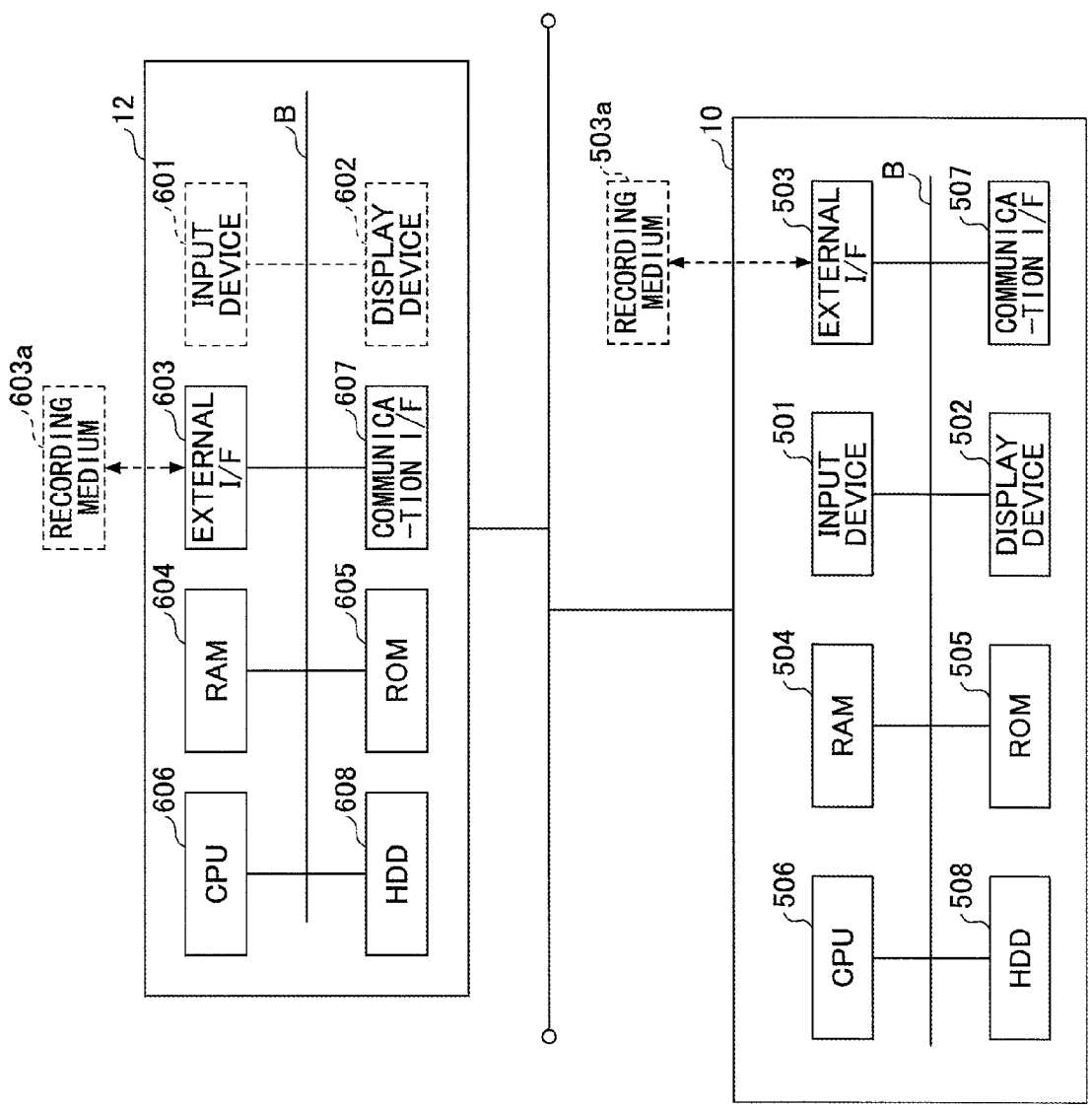
FIG. 2 is a hardware configuration diagram of one example of computers implementing the conference system according to the embodiment.

Each terminal apparatus 10 and the conference server apparatus 12 have, for example, hardware configurations such as those shown in FIG. 2.

FIG. 2 is a hardware configuration diagram of one example of computers implementing the conference system according to the embodiment. The terminal apparatus 10 shown in FIG. 2 includes an input device 501, a display device 502, an external I/F 503, a RAM 504, a ROM 505, a CPU 506, a communication I/F 507, a HDD 508 and so forth. The respective parts/devices are connected via a bus B. It is also possible that the terminal apparatus 10 has a configuration including a camera, a microphone, a speaker and/or the like.

The input device 501 includes a keyboard, a mouse, a touch panel and/or the like, and is used for inputting various operation signals into the terminal apparatus 10. The display device 502 displays a process result of the terminal apparatus 10. The communication I/F 507 is an interface connecting the terminal apparatus 10 with the network 14. Thus, the terminal apparatus 10 can carry out data communication with the conference server apparatus 12 via the communication I/F 507.

The HDD 508 is a nonvolatile storage device storing programs and/or data. The stored programs and/or data include an OS as basic software for controlling the entirety of the terminal apparatus 10, application software providing various functions under the control of the OS, and so forth.

The external I/F 503 is an interface for an external device. The external device can be a recording medium 503a or the like. Thus, the terminal apparatus 10 can carry out reading information from and writing information to the recording medium 503a via the external I/F 503. The recording medium 503a can be a flexible disk, a CD, a DVD, a SD memory card, a USB memory or the like.

The ROM 505 is a nonvolatile semiconductor memory (storage device) that can hold a program and/or data even after the power supply is turned off. In the ROM 505, a program and/or data such as BIOS to be executed when the terminal apparatus 10 is started, OS settings, network settings and/or the like are stored. The RAM 504 is a volatile semiconductor memory temporarily storing a program and/or data The CPU 506 is a processor that reads a program and/or data from a storage device such as the ROM 505 or the HDD 508 into the RAM 504, carries out processes and thus, controls the entirety of the terminal apparatus 10 and implements functions.

Each terminal apparatus 10 can implement various processes as will be described later as a result of, for example, executing a program(s) with the above-mentioned hardware configuration.

The conference server apparatus 12 shown in FIG. 2 includes an input device 601, a display device 602, an external I/F 603, a RAM 604, a ROM 605, a CPU 606, a communication I/F 607, a HDD 608 and so forth. The respective parts/devices are connected via a bus B. Note that such a style can be employed that the input device 601 and the display device 602 are connected if necessary and used.

The input device 601 includes a keyboard, a mouse, a touch panel and/or the like, and is used for inputting various operation signals to the conference server apparatus 12. The display device 602 displays a process result of the conference server apparatus 12.

The communication I/F 607 is an interface connecting the conference server apparatus 12 with the network 14. The conference server apparatus 12 can carry out data communication with the terminal apparatuses 10 via the communication I/F 607.

The HDD 608 is a nonvolatile storage device storing programs and/or data. The stored programs and/or data include an OS as basic software for controlling the entirety of the conference server apparatus 12, application software providing various functions under the control of the OS, and so forth.

The external I/F 603 is an interface for an external device. The external device can be a recording medium 603a or the like. Thus, the conference server apparatus 12 can carry out reading information from and writing information to the recording medium 603a via the external I/F 603. The recording medium 603a can be a flexible disk, a CD, a DVD, a SD memory card, a USB memory or the like.

The ROM 605 is a nonvolatile semiconductor memory (storage device) that can hold a program and/or data even after the power supply is turned off. In the ROM 605, a program and/or data such as BIOS to be executed when the conference server apparatus 12 is started, OS settings, network settings, and/or the like, are stored. The RAM 604 is a volatile semiconductor memory temporarily storing a program and/or data.

The CPU 606 is a processor that reads a program and/or data from a storage device such as the ROM 605 or the HDD 608 into the RAM 604, carries out processes and thus, controls the entirety of the conference server apparatus 12 and implements functions.

The conference server apparatus 12 can implement various processes as will be described later as a result of, for example, executing a program(s) with the above-mentioned hardware configuration.

<Software Configuration>

Figure 3:
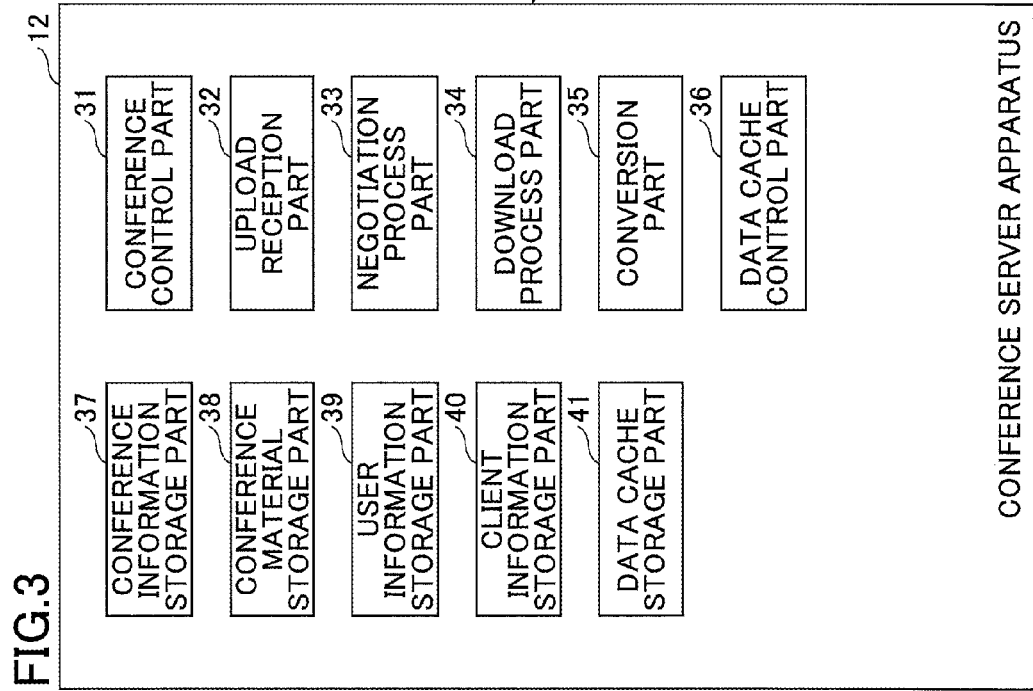
FIG. 3 is a functional block diagram of one example of the conference system according to the embodiment.

The conference system 1 according to the embodiment is implemented by, for example, a functional block shown in FIG. 3. FIG. 3 is a functional block diagram of one example of the conference system according to the embodiment.

The terminal apparatus 10 implements, by executing a program of a conference application or the like, an upload request part 21, a login request part 22, a negotiation request part 23, a download request part 24, a conference process part 25, a page cache control part 26, a page cache storage part 27 and a synchronous/non-synchronous management part 28.

The conference server apparatus 12 implements, by executing a program, a conference control part 31, an upload reception part 32, a negotiation process part 33, a download process part 34, a conversion part 35, a data cache control part 36, a conference information storage part 37, a conference material storage part 38, a user information storage part 39, a client information storage part 40 and a data cache storage part 41.

Note that it is possible that another server apparatus, or so, capable of carrying out data transmission and reception to and from the conference server apparatus 12, has the conference information storage part 37, the conference material storage part 38, the user information storage part 39, the client information storage part 40 and the data cache storage part 41.

The upload request part 21 is operated by a participant of a conference, and requests the conference server apparatus 12 to upload conference material to the conference server apparatus 12. The login request part 22 is operated by a participant of a conference, and requests the conference server apparatus 12 to login thereto.

The negotiation request part 23 carries out negotiation with the conference server apparatus 12 mutually for information concerning a download method of downloading conference material. According to the embodiment, "negotiation" means a communication for determining a download method of downloading conference material. The download request part 24 requests the conference server apparatus 12 to download "download data" acquired through conversion from conference material based on information ("client information" described later) acquired from negotiation to the terminal apparatus 10.

The conference process part 25 displays download data received from the conference server apparatus 12 on the display device 502 or so. In the synchronous mode, the conference process part 25 carries out a "synchronous display" of conference material between the terminal apparatus 10 and another terminal apparatus(es) 10. For example, when a presenter who is one of the participants of a conference operates the own terminal apparatus 10 (the terminal apparatus 10 operated by the presenter) to carry out "paging" on conference material or so, this terminal apparatus 10 transmits information concerning this presenter's operation to the conference server apparatus 12.

As the information concerning the presenter's operation, page identification information for identifying the page to be synchronized is transmitted, for example, to the conference server apparatus 12. It is also possible that the information concerning the presenter's operation includes, in addition to the page identification information mentioned above, the address information of the terminal apparatus 10 of the presenter and conference material identification information for identifying the conference material including the page to be synchronized. The conference material identification information can be any information as long as it is used for identifying the conference material. For example, it is possible to use information such as the name of the material, the identification number of the material or the address information storing the material as the conference material identification information.

Each of the terminal apparatuses 10 of the participants of the conference (the terminal apparatus 10 operated by each participant) other than the presenter receives the information concerning the presenter's operation (the information concerning the presenter's operation transmitted by the presenter's terminal apparatus 10 to the conference server apparatus 12) from the conference server apparatus 12. In the synchronous mode, the terminal apparatus 10 of each participant implements a "synchronous display" of the conference material with another terminal apparatus(es) 10 by displaying download data based on the information concerning the presenter's operation such as "paging".

Further, in the non-synchronous mode, the terminal apparatus 10 of the participant implements a "non-synchronous display" of the conference material by not following the information concerning the presenter's operation received from the conference server apparatus 12 and displaying download data based on information concerning the participant's operation. Thus, in the non-synchronous mode, the terminal apparatus 10 in the non-synchronous mode can temporarily display information other than the page of the conference material designated by the conference server apparatus 12.

The page cache control part 26 determines download data to be stored in the page cache storage part 27 after a start of a conference, and causes the download request part 24 to download "download data" from the conference server apparatus 12 if necessary. The page cache storage part 27 stores download data in a manner of associating it with the identification information of the corresponding page. The synchronous/non-synchronous management part 28 manages the synchronous mode and the non-synchronous mode of the terminal apparatus 10.

The conference control part 31 transmits information concerning the presenter's operation received from the presenter's terminal apparatus 10 to the terminal apparatuses 10 of the respective participants. The conference control part 31 receives a login request from the terminal apparatus 10 and carries out a login process. Conference information and user information described later are used for the login process.

When receiving a request to upload conference material from the terminal apparatus 10, the upload reception part 32 stores the thus uploaded conference material in the conference material storage part 38. The negotiation process part 33 carries out negotiation with the terminal apparatus 10. The negotiation process part 33 stores information concerning a download method of downloading conference material acquired from negotiation in the client information storage part 40 as client information.

The download process part 34 transmits download data, downloading of which is requested by the terminal apparatus 10, to the terminal apparatus 10. The conversion part 35 converts conference material into download data based on client information. The data cache control part 36 determines download data to be stored in the data cache storage part 41. The data cache control part 36 requests the conversion part 35 to convert conference material into download data and stores download data thus determined to be stored in the data cache storage part 41.

Note that it is also possible that a conversion server apparatus connected with the conference server apparatus 12 via the network 14 has the function of the conversion part 35. In such a case, the conference server apparatus 12 requests the conversion server apparatus to carry out conversion and receives download data acquired through conversion by the conversion server apparatus. Further, it is also possible that the conversion server apparatus can be one shared with another server apparatus which is used for another Web service.

The conference information storage part 37 stores "conference information". "Conference information" is information concerning a registered conference and includes a conference name, date and time thereof, uploaded conference material, a conference state, and so forth. The conference material storage part 38 stores data (a file) of conference material. The user information storage part 39 stores accounts of a conference's participants who login, passwords thereof, and so forth.

The client information storage part 40 stores, as "client information", information concerning a download method of downloading conference material acquired by the negotiation process part 33 through negotiation. The client information storage part 40 also stores "page information" of conference material indicating a page of the conference material currently displayed by each terminal apparatus 10 that is in the synchronous mode. The data cache storage part 41 stores download data which is determined by the data cache control part 36 to store.

<Details of Process>

Below, details of a process in the conference system 1 according to the embodiment will be described.

Figure 4:
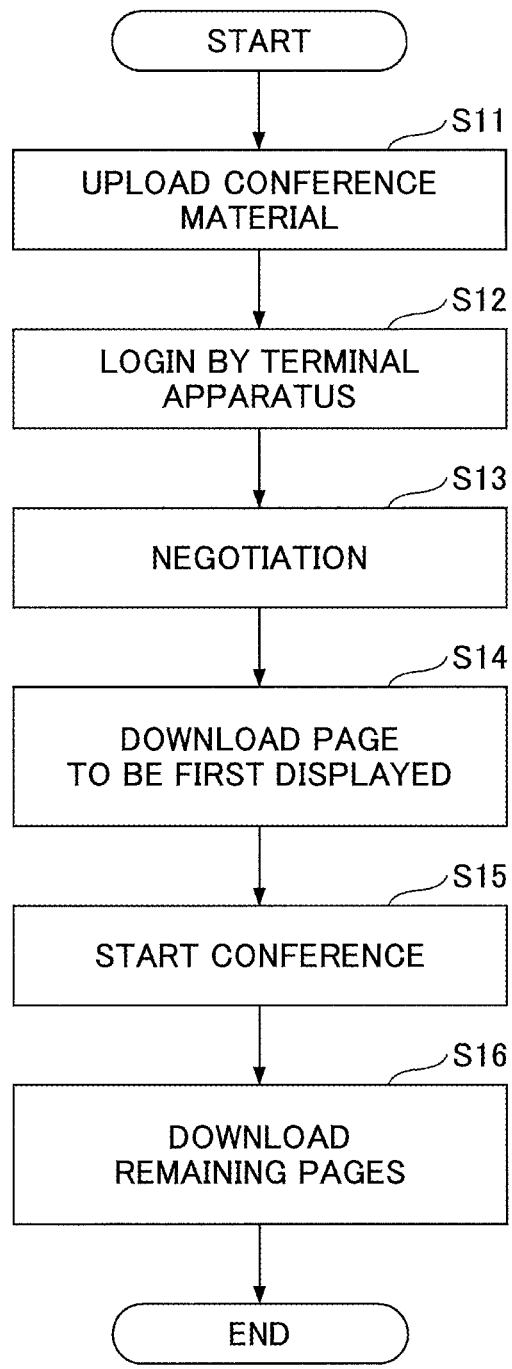
FIG. 4 is a flowchart of a process of one example from uploading conference material to downloading the same.

FIG. 4 is a flowchart of a process of one example from uploading conference material to downloading the same. In step S11, a presenter, a host or the like of a conference, uploads conference material before actually conducting the conference. That is, the upload request part 21 of his or her terminal apparatus 10 responds to the operation performed by the presenter, host or the like of the conference on the terminal apparatus 10 and requests the upload reception part 32 of the conference server apparatus 12 to upload the conference material from the terminal apparatus 10. The upload reception part 32 receives the upload request from the upload request part 21 of the terminal apparatus 10 to upload the conference material and stores the conference material thus uploaded in the conference material storage part 38.

In step S12, the respective participants who participate in the conference login to the conference server apparatus 12 by using respective accounts, passwords and/or the like from their respective terminal apparatuses 10. That is, the login request part 22 of each terminal apparatus 10 requests the conference control part 31 of the conference server apparatus 12 to login, for example, by using the corresponding account, password and/or the like that are/is input by the corresponding participant, for example. The conference control part 31 receives the login request from the login request part 22 of each terminal apparatus 10 and carries out a login process.

When the login is successful, the negotiation request part 23 of the terminal apparatus 10 carries out negotiation with the negotiation process part 33 of the conference server apparatus 12 in step S13. Note that one example of information concerning a download method of downloading conference material is "page by page, a JPEG format and 1024×768 pixels" or so.

After the finish of negotiation, the terminal apparatus 10 receives download data of a page to be first displayed from the conference server apparatus 12 in step S14. Note that the download data received by the terminal apparatus 10 from the conference server apparatus 12 is one acquired from conversion of the conference material based on the information concerning the download method acquired through the negotiation. For example, the download data of the page to be displayed first is, normally, data for displaying the first page of the conference material. The download request part 24 of the terminal apparatus 10 receives the download data of the page to be displayed first from the download process part 34 of the conference server apparatus 12.

After the download data of the page to be displayed first is downloaded to all the terminal apparatuses 10 operated by the respective participants (the finish of transmission), the process proceeds to step S15 and the conference is started in the conference system 1.

Thus, according to the conference system 1 of the embodiment, a conference can be started at the time when a page to be first displayed is downloaded. Therefore, according to the conference system 1 of the embodiment, it is possible to remarkably advance the start of a conference in comparison to a case where a conference is started after all the pages are downloaded. For example, according to the conference system 1 of the embodiment, in a case where conference material includes 100 pages, a time required for the start of a conference can be reduced to about one-hundredth in comparison to downloading all the pages of conference material before the start of the conference.

Then, the remaining pages other than the page to be displayed first (the remaining part of the conference material) are downloaded to each terminal apparatus 10 from the conference server apparatus 12 through a background process in step S16 after the start of the conference.

Further, after the conference is started, the synchronous/non-synchronous management part 28 in each terminal apparatus 10 switches between the synchronous mode and the non-synchronous mode in response to the participant's operation performed on the terminal apparatus 10. In the synchronous mode, the conference process part 25 in the terminal apparatus 10 carries out a "synchronous display" of the conference material with another terminal apparatus(es) 10. On the other hand, in the non-synchronous mode, the conference process part 25 in the terminal apparatus 10 carries out a "non-synchronous display" of the conference material with respect to the other terminal apparatuses 10. The terminal apparatus 10 in the non-synchronous mode is capable of temporarily displaying information other than the page of the conference material designated by the conference server apparatus 20.

<<Negotiation>>

Figure 5:
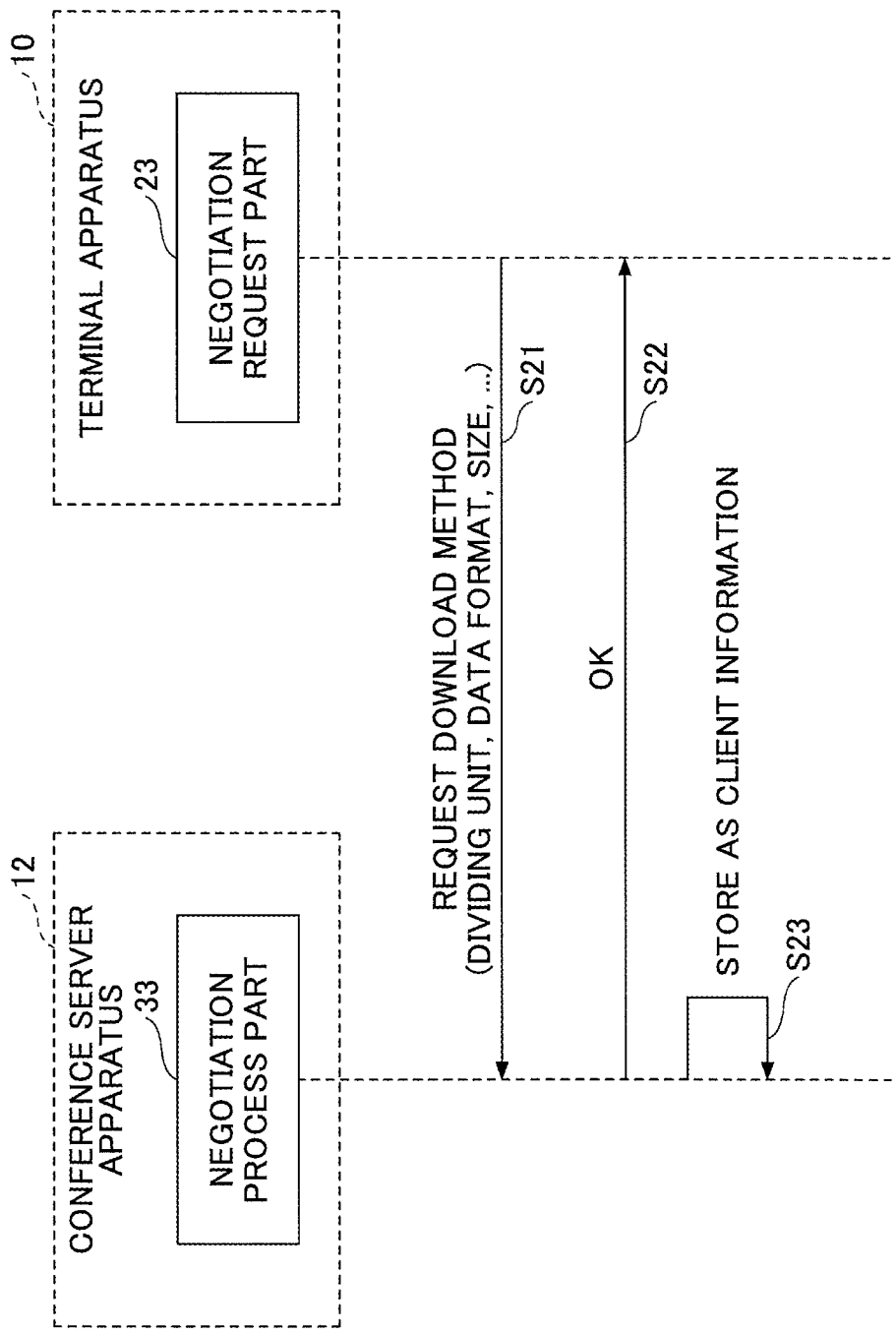
FIG. 5 is a sequence diagram of one example of a negotiation process.

"Negotiation" of step S13 of FIG. 4 is carried out, for example, as shown in a sequence diagram of FIG. 5. FIG. 5 is a sequence diagram of one example of a negotiation process.

In step S21, the negotiation request part 23 of the terminal apparatus 10 sends a request for a download method to the negotiation process part 33 of the conference server apparatus 12 for carrying out negotiation to determine the download method. The request for a download method sent by the terminal apparatus 10 includes, as designated items, for example, a dividing unit of dividing conference material, a data format, a display size and so forth. Note that default values, for example, can be used for items not included in the request for a download method sent from the terminal apparatus 10.

Note that the contents of a request for a download method transmitted from the terminal apparatus 10 are not limited to those described above. For example, the contents of the request for a download method can be information indicating the type of the terminal apparatus 10. For example, it is possible that type identification information for identifying the type of the transmission terminal 10 such as a smartphone, a portable phone, an electronic blackboard, a PC, a tablet terminal, a projector, a conference terminal or the like is transmitted from the terminal apparatus 10 to the conference server apparatus 12 as the contents of a request for a download method.

In such a case, a table in which respective download methods (dividing units, data formats, display sizes and/or the like) are associated with respective types of the terminal apparatuses 10 is previously stored in the client information storage part 40. By such a configuration, the conference server apparatus 12 can determine a download method based on received type identification information.

Further, it is also possible that the contents of a request for a download method are terminal identification information, unique to each terminal apparatus 10, for identifying the terminal apparatus 10. In such a case, a table in which respective download methods (dividing units, data formats, display sizes and/or the like) for the respective terminal apparatuses 10 are associated with respective sets of terminal identification information is previously stored in the client information storage part 40. By such a configuration, the conference server apparatus 12 can determine a download method based on received terminal identification information.

Further, it is also possible that the contents of a request for a download method are display method identification information for identifying a method of displaying information in the terminal apparatus 10. Specific examples of the method of displaying information include a method of displaying information using a Web browser, a method of displaying information using an application installed in the terminal apparatus 10, and so forth. In such a case, a table in which respective download methods (dividing units, data formats, display sizes and/or the like) are associated with respective sets of display method identification information for identifying methods of displaying information in the terminal apparatuses 10 is previously stored in the client information storage part 40. By such a configuration, the conference server apparatus 12 can determine a download method based on received display method identification information.

When the conference server apparatus 12 is capable of implementing the designated items of the request for a download method thus sent from the terminal apparatus 10, the negotiation process part 33 of the conference server apparatus 12 proceeds to step S22 and responds to the request for a download method by indicating to be capable of implementing the designated items by sending a message "OK" or the like to the terminal apparatus 10. The process of step S22 can be omitted.

In step S23, the negotiation process part 33 of the conference server apparatus 12 stores the designated items of the request for a download method as client information in the client information storage part 40 as shown in FIG. 6. Note that when a download method to implement is previously stored in the client information storage part 10 as mentioned above, it is not necessary to store information concerning a download method in step S23.

FIG. 6 is a configuration diagram of one example of client information. As shown in FIG. 6, client information includes, as (designated) items, a client ID, a dividing unit, a data format, a size, cache information and so forth. A "client ID" is identification information for identifying each terminal apparatus 10.

A "client ID" can be a session ID designated along with an establishment of a communication session between the terminal apparatus 10 and the conference server apparatus 12. It is also possible that a client ID is the address information of the terminal apparatus 10. A "dividing unit" is a unit of dividing conference material and is, for example, "page by page". A "data format" is a data format of download data and is, for example, "JPEG format". The format is not limited to the "JPEG format" and can be a "PDF format", for example.

A "size" is the number of pixels of "download data" and is, for example, "1024×768 pixels". "Cache information" includes information concerning the number of cacheable pages, information concerning an algorithm for determining a page to be cached, and/or the like.

Thus, in negotiation of step S13 of FIG. 4, it is possible to designate various combinations of a dividing unit of dividing conference material, a data format, a size, and/or the like, to the conference server apparatus 12 from each terminal apparatus 10 separately.

Note that, in negotiation of step S13, it is also possible that, based on "cache information" of the terminal apparatus 10, the conference server apparatus 12 determines a dividing unit of dividing conference material, a data format, a size and/or the like. In this case, it is possible that the conference server apparatus 12 receives "cache information" from the terminal apparatus 10 and determines, according to the received cache information, a dividing unit of dividing conference material, a data format, a size and/or the like. Note that "cache information" depends, for example, on the capability of the hardware of the terminal apparatus 10. The number of pages that can be cached (cacheable pages) included in the cache information is information determined according to the size of the storage area provided by the hardware. Thus, a download method of downloading conference material determined through negotiation is a process according to the capability of each terminal apparatus 10 which may be different for each terminal apparatus 10.

<<Downloading Page to be First Displayed>>

Figure 7:
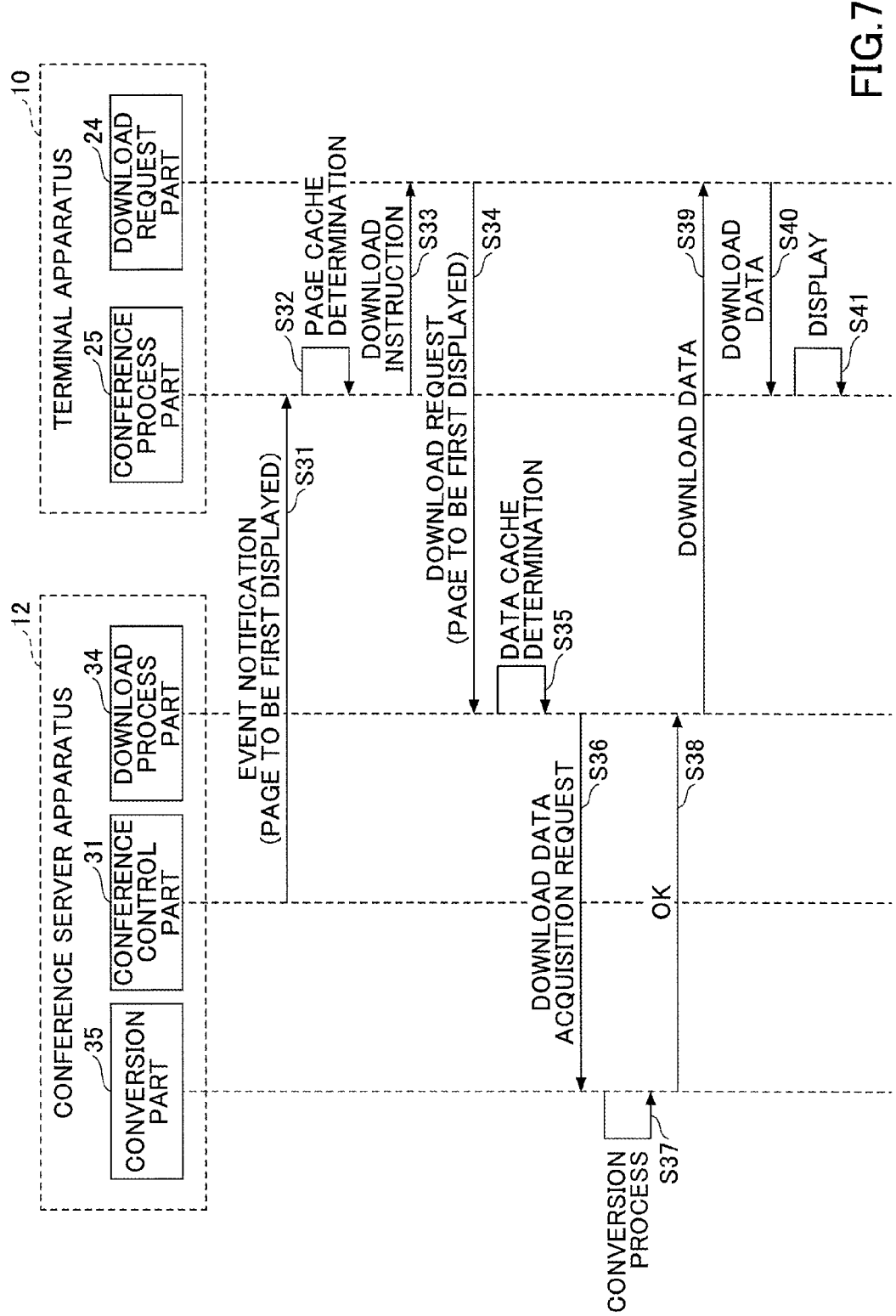
FIG. 7 is a sequence diagram of one example of a process of downloading a page to be displayed first.

Downloading a page to be first displayed in step S14 of FIG. 4 is carried out, for example, as shown in FIG. 7. FIG. 7 is a sequence diagram of one example of a process of downloading a page to be displayed first.

To the terminal apparatus 10 that has finished negotiation in step S13, the conference control part 31 of the conference server apparatus 12 sends a conference material display event notification in which a page to be displayed is designated, in step S31. The designation of a page can be implemented by, for example, including page identification information for identifying the page in the conference material display event notification.

In step S32, the conference process part 25 of the terminal apparatus 10 determines whether download data corresponding to the page identification information of the conference material designated in step S31 is stored in the page cache storage part 27. Here, it is assumed that the download data corresponding to the designated page identification information of the conference material is not stored in the page cache storage part 27.

In step S33, the conference process part 25 sends an instruction to the download request part 24 to download the download data corresponding to the designated page identification information of the conference material. In step S34, the download request part 24 requests the download process part 34 of the conference server apparatus 12 to download the download data corresponding to the designated page identification information of the conference material to the terminal apparatus 10.

In step S35, the download process part 34 of the conference server apparatus 12 determines whether the download data corresponding to the designated page identification information of the conference material is stored in the data cache storage part 41. Here, it is assumed that the download data corresponding to the designated page identification information of the conference material is not stored in the data cache storage part 41.

In step S36, the download process part 34 requests the conversion part 35 to acquire the download data corresponding to the designated page identification information of the conference material through conversion. In step S37, the conversion part 35 carries out conversion using conference material to acquire the download data corresponding to the designated page identification information (of the page to be displayed first) of the conference material based on the client information corresponding to the terminal apparatus 10 that is the request source.

After the finish of the conversion, in step S38, the conversion part 35 responds to the request by indicating that the conversion to acquire the download data corresponding to the designated page identification information of the conference material is finished by, for example, sending a message "OK" or the like to the download process part 34. In step S39, the download process part 34 transmits the thus acquired download data corresponding to the designated page identification information of the conference material requested by the download request part 24 of the terminal apparatus 10 to the download request part 24.

In step S40, the download request part 24 transmits the download data corresponding to the designated page identification information of the conference material to the conference process part 25. In step S41, the conference process part 25 displays the download data corresponding to the designated page identification information of the conference material on the display device 502 or the like, and thus, carries out a "synchronous display" of the conference material with the other terminal apparatuses 10. Note that it is assumed that when the conference is started, each terminal apparatus 10 is in the synchronous mode.

Figure 8:
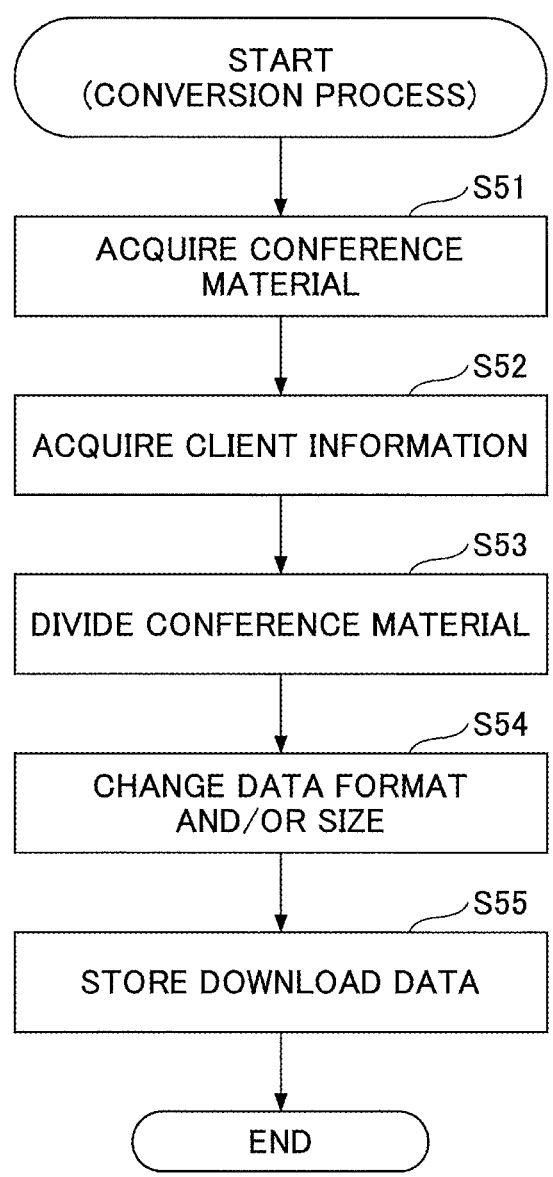
FIG. 8 is a flowchart of one example of a conversion process of converting conference material into download data.

Note that the conversion process of step S37 of FIG. 7 can be carried out, for example, as shown in FIG. 8. FIG. 8 is a flowchart of one example of a conversion process of converting conference material into download data.

In step S51, the conversion part 35 acquires the conference material including the designated page from the conference material storage part 38. In step S52, the conversion part 35 acquires the client information corresponding to the terminal apparatus 10 that is the request source sending the download request in step S34 of FIG. 7.

In step S53, the conversion part 35 divides the conference material to acquire a division including the designated page of the conference material based on the "dividing unit" of the client information and the designated page of the conference material. In step S54, the conversion part 35 converts the data format and the size of the thus acquired division of the conference material into those according to the client information to acquire the download data.

In step S55, the conversion part 35 stores the thus acquired download data in the data cache storage part 41 in a manner of associating it with the corresponding page identification information, respectively. When the dividing unit is two or more pages, it is possible to associate each set of the download data with the page identification information of the corresponding plurality of pages. Note that it is also possible that the thus acquired download data is stored in the conference material storage part 38. Further, according to the conference system 1 in the embodiment, it is also possible that, in order to reduce a time required to acquire "download data" through conversion, conversion is carried out to acquire download data for the typical dividing unit, data format and size and the thus acquired download data is stored previously.

<<Downloading Remaining Pages>>

Figure 9:
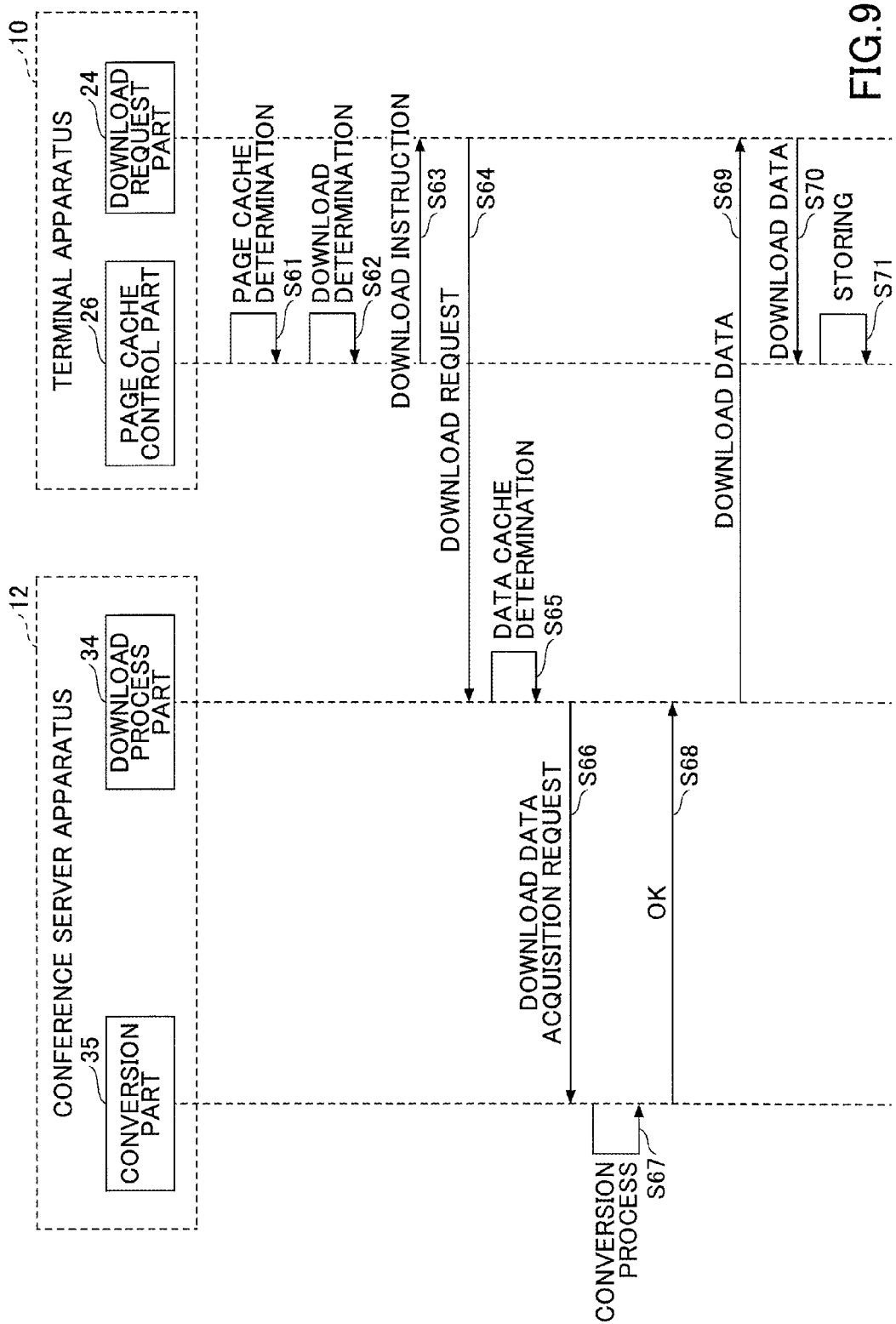
FIG. 9 is a sequence diagram of one example of a process of downloading the remaining pages.

"Downloading remaining pages" in step S16 of FIG. 4 is carried out, for example, as shown in FIG. 9. FIG. 9 is a sequence diagram of one example of a process of downloading the remaining pages. After the start of the conference, each terminal apparatus 10 carries out the process of FIG. 9 in an arbitrary timing and thus, can receive the remaining pages of download data from the conference server apparatus 12.

In step S61, the page cache control part 26 checks the download data stored in the page cache storage part 27 and the space area in the page cache storage part 27. In step S62, the page cache control part 26 determines whether it is necessary to carry out downloading as will be described later. Here, it is assumed that the page cache control part 26 determines it is necessary to carry out downloading.

When thus determining it is necessary to carry out downloading, the page cache control part 26 sends an instruction to the download request part 24 to download "download data" of a page of the conference material thus determined necessary to download, in step S63. In step S64, the download request part 24 requests the download process part 34 of the conference server apparatus 12 to download the download data corresponding to the page of the conference material thus determined necessary to download to the terminal apparatus 10. The download request thus sent to the download process part 34 of the conference server apparatus 12 includes the page identification information of the conference material thus determined necessary to download.

In step S65, the download process part 34 of the conference server apparatus 12 determines, based on the received page identification information, whether the download data thus requested by the terminal apparatus 10 is stored in the data cache storage part 41. Here, it is assumed that the requested download data is not stored in the data cache storage part 41. In step S66, the download process part 34 requests the conversion part 35 to carry out conversion to acquire the download data of the requested page of the conference material.

In step S67, the conversion part 35 carries out conversion to acquire the download data of the requested page of the conference material based on the client information corresponding to the terminal apparatus 10 that is the request source. When the conversion process is thus finished, the conversion part 35 responds to the request to indicate that the conversion to acquire the download data of the requested page of the conference material is finished by, for example, sending a message "OK" or the like to the download process part 34 in step S68.

In step S69, the download process part 34 transmits the download data corresponding to the page identification information of the conference material requested by the download request part 24 of the terminal apparatus 10 to the download request part 24.

In step S70, the download request part 24 transmits the download data corresponding to the designated page identification information of the conference material to the page cache control part 26. In step S71, the page cache control part 26 stores the download data of the page of the conference material determined necessary in the page cache storage part 27 in a manner of associating it with the page identification information.

Figure 10:
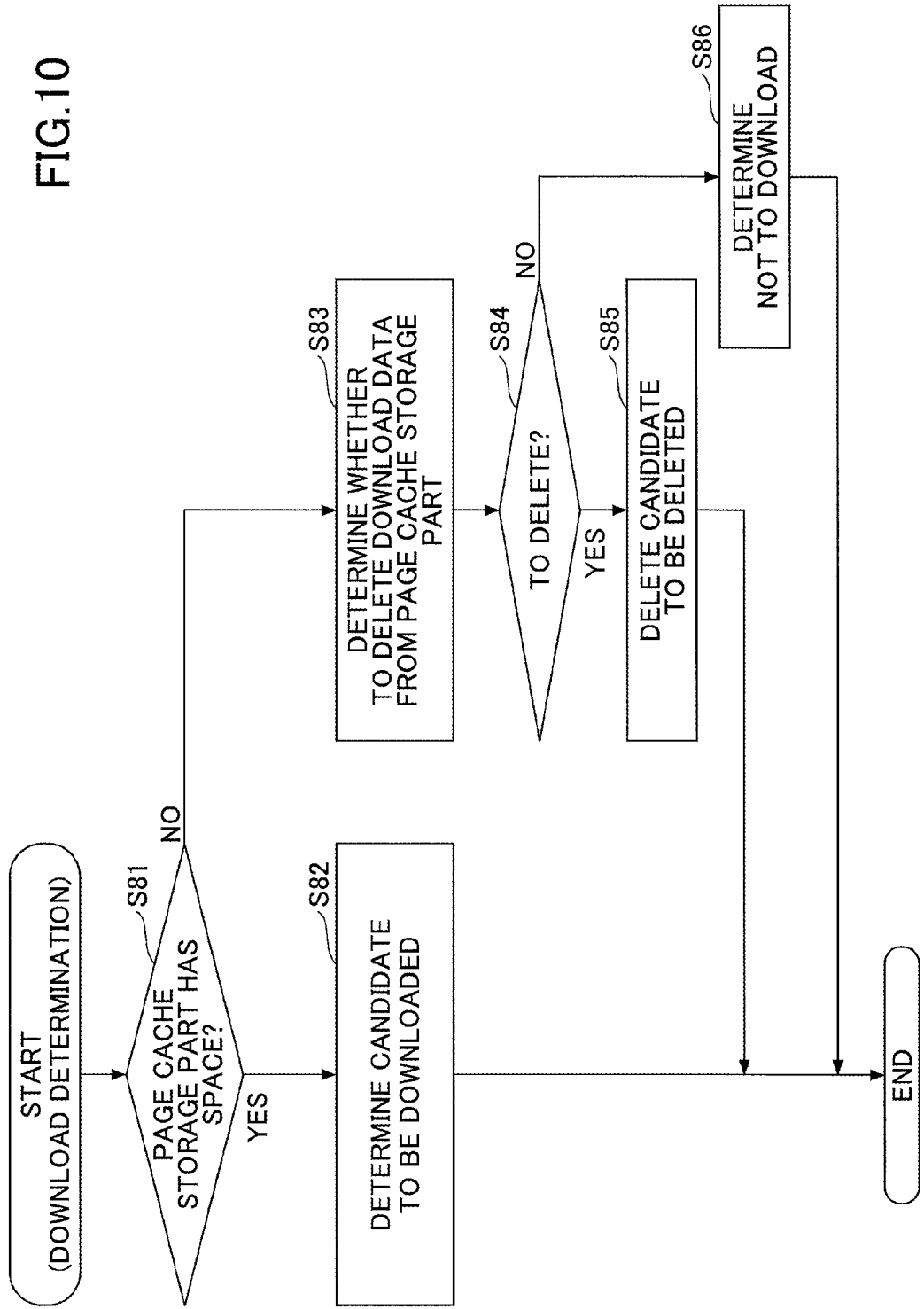
FIG. 10 is a flowchart of one example of a download determination process of determining whether it is necessary to carry out downloading.
Figure 11:
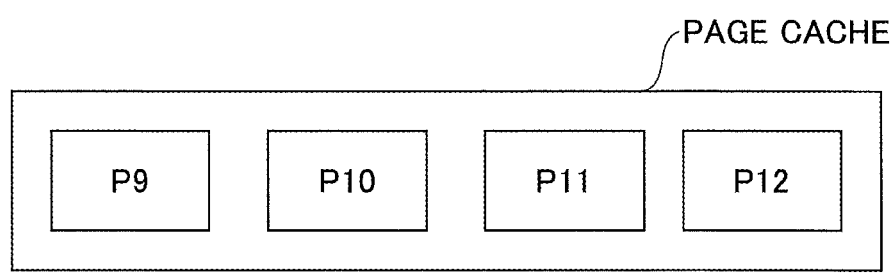
FIG. 11 is a configuration diagram of one example of a page cache storage part.

Note that determination as to whether it is necessary to carry out downloading (download determination) in step S62 of FIG. 9 can be carried out, for example, as shown in FIG. 10. FIG. 10 is a flowchart of one example of a download determination process of determining whether it is necessary to carry out downloading. FIG. 11 is a configuration diagram of one example of the page cache storage part.

In step S81, the page cache control part 26 determines whether the page cache storage part 27 such as that shown in FIG. 11 has a space area. Note that the page cache storage part 27 shown in FIG. 11 shows an example where the number of cacheable pages is "4", and shows an example where the page cache storage part 27 has no space area. When the terminal apparatus 10 is displaying the page 10, the page cache storage part 27 of FIG. 11 stores, for example, the download data of the pages 9, 11 and 12 near the page 10 in addition to the download data of the page 10 in a manner of associating it with the page identification information.

When the page cache storage part 27 of FIG. 11 has a space area (YES), the page cache control part 26 proceeds to step S82. In step S82, the page cache control part 26 determines a page likely to be required (i.e., important page) such as a page near the currently displayed page as a candidate to be downloaded. Note that it is also possible that, in step S82, a candidate for download data is determined in such a manner not to store duplicate download data in the page cache storage part 27.

For example, the page cache control part 26 determines, as a candidate to be downloaded, download data of a page most likely to be required subsequently due to a user's operation such as "paging", such as a page nearer the page currently displayed on the display device 502 or the like.

On the other hand, in step S81, when determining that the page cache storage part 27 has no space area (NO), the page cache control part 26 proceeds to step S83. In step S83, the page cache control part 26 determines whether to delete download data of a page of the conference material stored in the page cache storage part 27.

For example, the page cache control part 26 determines as a candidate to be deleted, download data of a page least likely to be required subsequently due to a user's operation such as "paging", such as a page farthest from the page currently displayed on the display device 502 or the like.

Further, the page cache control part 26 determines, as a candidate to be downloaded (a candidate for download data), download data most likely to be required subsequently from among the download data not stored in the page cache storage part 27.

The page cache control part 26 determines to delete the candidate to be deleted when the candidate to be downloaded is more likely to be required subsequently than the candidate to be deleted.

When the page cache control part 26 thus determines to delete the candidate to be deleted (YES), the page cache control part 26 proceeds to step S85 from step S84, and deletes the candidate to be deleted from the page cache storage part 27.

On the other hand, when determining not to delete the candidate to be deleted (NO), the page cache control part 26 proceeds to step S86 from step S84, and determines it is unnecessary to download the candidate to be downloaded.

According to the process of downloading the remaining pages shown in FIG. 9, when the page cache storage part 27 has a space area, it is possible to previously download "download data" of a page (important page) likely to be required subsequently to the terminal apparatus 10 from the conference server apparatus 12.

Further, even when the page cache storage part 27 has no space area, it is possible to previously download "download data" of a page likely to be required subsequently to the terminal apparatus 10 from the conference server apparatus 12 by deleting download data less likely to be required subsequently to create a space area. When downloading download data likely to be required subsequently is thus finished, the process of downloading the remaining pages is interrupted (idling), which is restarted after an operation such as "paging" is carried out.

<<Process at Time of Change of Displaying Page in Synchronous Mode>>

After the start of the conference, each participant can carry out a "synchronous display" of the conference material or temporarily display information other than the page of the conference material designated by the conference server apparatus 12 by appropriately switching between the synchronous mode and the non-synchronous mode in the terminal apparatus 10 operated by the participant. When the page that is being displayed on each terminal apparatus 10 is changed, the terminal apparatus 10 carries out a process which is different depending on whether the terminal apparatus is in the synchronous mode or the non-synchronous mode, as will be described now.

Figure 12:
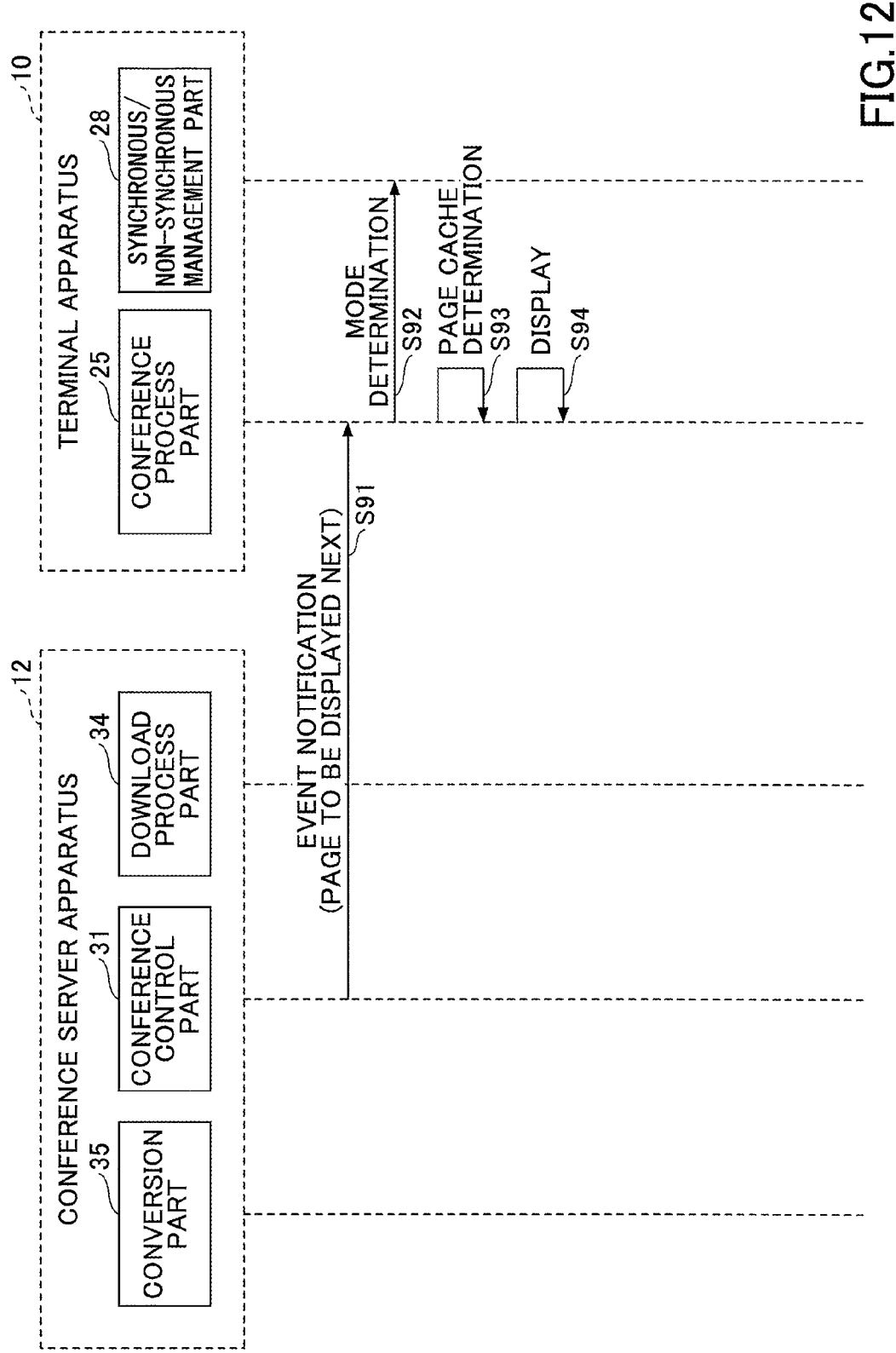
FIG. 12 is a sequence diagram of one example of a process when a page to be displayed is changed in a synchronous mode.

For example, when an operation such as "paging" is performed and the page that to be displayed is thus changed in the synchronous mode, the page of the conference material currently being delayed on the display device 502 of the corresponding terminal apparatus 10 is changed as shown in FIG. 12 in the conference system 1 according to the present embodiment. FIG. 12 is a sequence diagram of one example of a process when the page to be displayed is changed in the synchronous mode.

It is assumed that the conference server apparatus 12 receives information of an operation of "paging" from the presenter's terminal apparatus 10. In step S91, the conference control part 31 of the conference server apparatus 12 sends a conference material event notification in which the page to be subsequently displayed is designated to each terminal apparatus 10 based on the received information of the operation of "paging" from the presenter's terminal apparatus 10.

In step S92, the conference process part 25 of the terminal apparatus 10 queries the synchronous/non-synchronous management part 28 for the current mode, and determines whether the current mode is the synchronous mode or the non-synchronous mode. As a result, the conference process part 25 determines that the current mode is the synchronous mode.

In step S93, the conference process part 25 of the terminal apparatus 10 determines whether the download data corresponding to the page of the conference material designated in step S91 is stored in the page cache storage part 27. Here, it is assumed that the download data corresponding to the page of the conference material designated in step S91 is stored in the page cache storage part 27.

In step S94, the conference process part 25 acquires the download data corresponding to the page of the conference material designated in step S91 from the page cache storage part 27, displays the acquired page on the display device 502 or so, and thus, carries out a "synchronous display" of the conference material with the other terminal apparatus(es) 10 of the synchronous mode. Note that when the download data corresponding to the page of the conference material designated in step S91 is not stored in the page cache storage part 27 in step S92, the conference process part 25 executes the process starting from step S33 of FIG. 7 and acquires the download data corresponding to the designated page of the conference material.

According to the conference system 1 in the embodiment, each terminal apparatus 10 carries out the process of FIG. 9 in an arbitrary timing, and thereby, receives the remaining pages of download data from the conference server apparatus 12. At this time, according to the conference system 1 in the embodiment, such control can be carried out that in order to avoid congestion in the network 14, a timing of downloading is made different among the respective terminal apparatuses 10 while band information is monitored.

By such control of thus making a timing of downloading different among the respective terminal apparatuses 10, the conference system 1 in the embodiment comes to have a secondary advantageous effect of avoiding degradation in the performance otherwise occurring due to the band being pressed. Further, according to the conference system 1 in the embodiment, under the control of the page cache control part 26, as a result of download data being stored in the page cache storage part 27, the pages of the conference material can be partially stored.

By thus caching download data in each terminal apparatus 10, it is expected to provide acquire high performance with a reduced resource (a memory, a local disk and/or the like).

<<Process at Time of Change of Displaying Page in Non-Synchronous Mode>>

Figure 13:
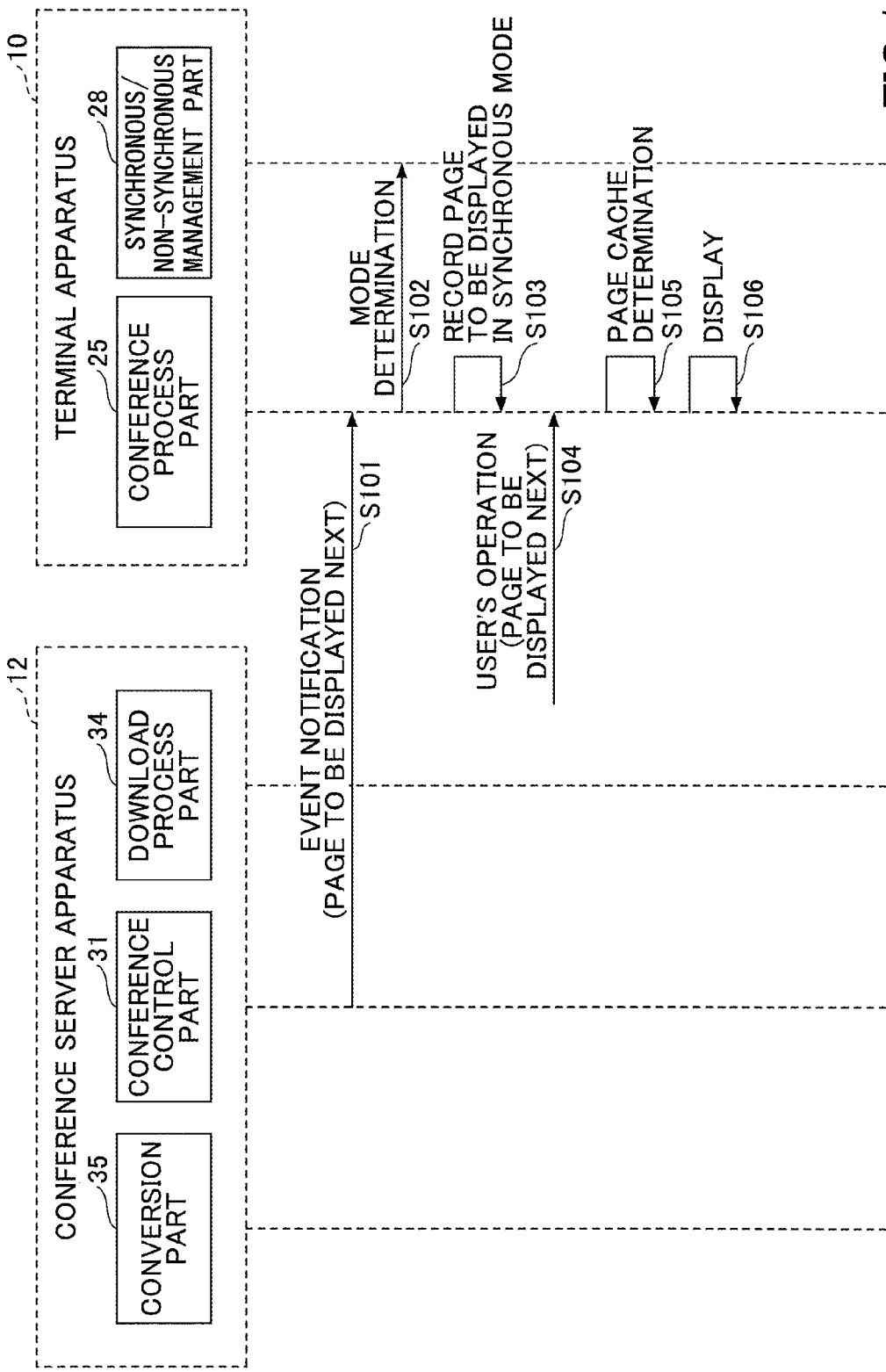
FIG. 13 is a sequence diagram of one example of a process when a page to be displayed is changed in a non-synchronous mode.

Further, according to the conference system 1 in the present embodiment, when an operation such as "paging" is carried out by the presenter and the page to be displayed is thus changed in the non-synchronous mode, the page of the conference material currently being delayed on the display device 502 of the corresponding terminal apparatus 10 is changed as shown in FIG. 13 in the conference system 1 according to the present embodiment. FIG. 13 is a sequence diagram of one example of a process when the page to be displayed is changed in the non-synchronous mode.

It is assumed that the conference server apparatus 12 receives information of an operation of "paging" from the presenter's terminal apparatus 10. In step S101, the conference control part 31 of the conference server apparatus 12 sends a conference material event notification in which the page to be subsequently displayed is designated, based on the received information of the operation of "paging" from the presenter's terminal apparatus 10. The designation of a page can be implemented by including the page identification information for identifying the page in the conference material event notification.

In step S102, the conference process part 25 of the terminal apparatus 10 queries the synchronous/non-synchronous management part 28 for the current mode, and determines whether the current mode is the synchronous mode or the non-synchronous mode. As a result, the conference process part 25 determines that the current mode is the non-synchronous mode.

In step S103, since the current mode is the non-synchronous mode, the conference process part 25 does not display the page of the conference material designated by the conference server apparatus 12. However, in order to be able to carry out a "synchronous display" of the designated page of the conference material immediately after a possible switching operation from the current non-synchronous mode to the synchronous mode, the conference process part 25 records and stores the page identification information of the page to be displayed in the synchronous mode each time receiving from the conference server apparatus 12 the page identification information of the page to be displayed in the synchronous mode.

In step S104, it is assumed that the conference process part 25 receives the operation from the participant designating a page to be displayed subsequently such as "paging" in the non-synchronous mode. In step S105, the conference process part 25 of the terminal apparatus 10 determines whether the download data corresponding to the page identification information of the conference material thus designated in step S104 is stored in the page cache storage part 27. Here, it is assumed that the download data corresponding to the page identification information of the conference material designated in step S104 is stored in the page cache storage part 27.

In step S106, the conference process part 25 acquires the download data corresponding to the page identification information of the conference material designated in step S104 from the page cache storage part 27, displays the acquired page on the display device 502 or so, and thus, carries out a "non-synchronous display" of the conference material. Note that when the download data corresponding to the page identification information of the conference material designated in step S104 is not stored in the page cache storage part 27 in step S105, the conference process part 25 executes the process starting from step S33 of FIG. 7 and acquires the download data corresponding to the designated page identification information of the conference material.

In the same way as in the synchronous mode, the corresponding terminal apparatus 10 carries out the process of FIG. 9 in an arbitrary timing also in the non-synchronous mode. Accordingly, also in the non-synchronous mode, the corresponding terminal apparatus 10 can receive download data of a page likely to be required subsequently and store it in the page cache storage part 27 previously.

<<Process at Time of Switching Between Synchronous Mode and Non-Synchronous Mode>>

When switching is carried out from the synchronous mode to the non-synchronous mode, the corresponding terminal apparatus 10 does not change the page of the conference material displayed on the display device 502 or so and does not change the download data in the page cache storage part 27 until the participant's operation such as "paging" is performed on the terminal apparatus 10. After the switching to the non-synchronous mode, the terminal apparatus 10 appropriately changes the displayed page of the conference material and/or changes the download data in the page cache storage part 27, in response to the participant's operation such as "paging" performed on the terminal apparatus 10.

On the other hand, when switching is performed from the non-synchronous mode to the synchronous mode, the terminal apparatus 10 should immediately carry out a "synchronous display" of the page of the conference material designated by the conference server apparatus 12. Therefore, it is likely that the displayed page of the conference material will be changed in the terminal apparatus 10. Further, it is also likely that the download data in the page cache storage part 27 in the terminal apparatus 10 was changed to download data that was likely to be required in the non-synchronous mode due to the participant's operation such as "paging" performed on the terminal apparatus 10 in the non-synchronous mode.

Therefore, when switching is performed from the non-synchronous mode to the synchronous mode, the terminal apparatus 10 carries out the process such as that shown in FIG. 14. FIG. 14 is a flowchart of one example of a process of the terminal apparatus when switching is performed from the non-synchronous mode to the synchronous mode.

When receiving the participant's operation to switch from the non-synchronous mode to the synchronous mode, the terminal apparatus 10 returns from the non-synchronous mode to the synchronous mode in step S111. At this time, the synchronous/non-synchronous management part 28 changes the current mode from the non-synchronous mode to the synchronous mode.

In step S112, the conference process part 25 reads the page identification information of the page to be displayed in the synchronous mode previously recorded in step S103 of FIG. 13. In step S113, the conference process part 25 determines whether the download data corresponding to the thus read page identification information of the page to be displayed in the synchronous mode is stored in the page cache storage part 27. That is, the conference process part 25 determines that the corresponding download data is stored when the corresponding download data is already received from the conference server apparatus 12 and is still left as being stored in the page cache storage part 27. A specific method of this determination can be implemented by, for example, determining whether the page identification information of the page to be displayed in the synchronous mode is coincident with the page identification information associated with the download data stored in the page cache storage part 27 through comparison therebetween.

It is also possible to implement this determination by preparing, in addition to the page cache storage part 27, a download data management table managing the page identification information corresponding to the download data that is already received and comparing the page identification information of the page to be displayed in the synchronous mode with the page identification information managed in this table. Note that when thus preparing the download data management table, it is necessary to delete the corresponding page identification information managed in the download management table in response to deletion of the download data that is once received and stored in the page cache storage part 27 if any.

When the determination result indicates that the download data corresponding to the page to be displayed in the synchronous mode is stored (YES), the conference process part 25 proceeds to step S114, acquires the download data corresponding to the page identification information of the page to be displayed in the synchronous mode from the page cache storage part 27 and carries out a "synchronous display" using it. On the other hand, when the determination result indicates that the download data corresponding to the page to be displayed in the synchronous mode is not stored (NO), the conference process part 25 proceeds to step S115, and carries out the process starting from step S33 of FIG. 7. The conference process part 25 thus acquires the download data corresponding to the page identification information of the page to be displayed in the synchronous mode. In step S116, the conference process part 25 displays the thus acquired download data on the display device 502 or so and thus carries out a "synchronous display" of the conference material.

After step S114 or S116, the page cache control part 26 carries out a process of FIG. 9 in arbitrary timing in step S117. Through the process of "downloading remaining pages" in FIG. 9, the download data in the page cache storage part 27 is changed, in sequence, to the download data which is likely to be required in the synchronous mode.

By the process of FIG. 14, the terminal apparatus 10 can thus carry out the "synchronous display" of the page of the conference material designated by the conference server apparatus 12 immediately after the switching from the non-synchronous mode to the synchronous mode. Also, the terminal apparatus 10 can change, in sequence, the download data in the page cache storage part 27 to the download data which is likely to be required in the synchronous mode.

Summary of Embodiment

The above-described embodiment of the present invention can be applied to a conference system in which conference material is electrically distributed to participants of a conference and the conference is presented while the participants view the distributed conference material from their own terminal apparatuses 10. Other than such a conference system 1, the present embodiment can also be applied to a seminar system or a lesson system in which material is electrically distributed to students of a seminar or a lesson and the seminar or the lesson is presented while the students view the distributed material from their own terminal apparatuses 10.

For example, in a conference system 1 in which conference material is electrically distributed and a conference is presented while the conference material is viewed by participants from the respective terminal apparatuses 10, it is desired that in order to save the time and start the conference as soon as possible, the conference material is distributed to all the participants within a short time. Further, as a conference held in such a conference system 1, there is a conference where conference material is to be distributed only to appropriate ones of the participants or a conference where conference material is to be withdrawn after the conference.

Therefore, in such a conference system 1, it may be important to distribute conference material rapidly and securely. In a conference system 1, conference material is previously uploaded to a conference server apparatus 12. Participants of a conference login to the conference server apparatus 12 from their own terminal apparatuses 10, respectively, when the time has come to start the conference. The participants of the conference download the conference material to their own terminal apparatuses 10, respectively. After all the participants finish downloading the conference material, the conference is started.

Note that the conference system 1 according to the present embodiment assumes to download conference material after the time to start a conference in order to be suitable for such a conference that conference material may be modified immediately before the time to start the conference and such a conference that conference material should be withdrawn after the conference is finished. Therefore, according to the conference system 1 of the present embodiment, a conference is to be started within a short time whereas the conference is such that download of conference material is started after the time to start the conference.

For this purpose, specifically, according to the conference system 1 of the present embodiment, conference material is downloaded in such a manner that the conference material is divided, and a conference is started at a time when one division of the conference material has been downloaded to each terminal apparatus 10. Thereby, in comparison to a case of downloading all of the conference material at once, it is possible to shorten the time required for starting the conference. The remaining divisions of the conference material are downloaded through a background process after the start of the conference from the conference server apparatus 12 to the respective terminal apparatuses 10.

Further, the conference system 1 according to the present embodiment is advantageous also from a security viewpoint, since download data less likely to be required subsequently, from among the download data that is downloaded to each terminal apparatus 10, is deleted in sequence.

Further, in the conference system 1 according to the present embodiment, it is possible to implement the synchronous mode and the non-synchronous mode in the terminal apparatus 10 even in the conference system 1 in which, as mentioned above, conference material is downloaded in a manner of being divided and a conference is started when one of the divisions of the conference material is thus downloaded.

According to the conference system in the present embodiment, it is possible to implement the non-synchronous mode in the terminal apparatus 10 before transmission of all the conference materiel is finished from the conference server apparatus 10 to the terminal apparatus 10.

Thus, according to the conference system in the present embodiment, it is possible to provide a terminal apparatus, an information processing system and an information processing method by which it is possible to implement a setting of temporarily displaying information other than information designated by an information processing apparatus without waiting for a finish of transmission of information from the information processing apparatus to the terminal apparatus.

The terminal apparatus, the information processing system and the information processing method have been described in the embodiment. However, the present invention is not limited to the specifically disclosed embodiment, and variations and modifications may be made without departing from the scope of the present invention. Note that the conference server apparatus 12 is one example of an information processing apparatus.

The conference system 1 is one example of an information processing system. The download request part 24 is one example of a reception part. The page cache storage part 27 is one example of a transmission information storage part. The conference process part 25 is one example of a display process part. The page cache control part 26 is one example of a transmission information storage control part. A page of conference material is one example of a portion of information to be displayed.

Note that, the conference system 1 according to the embodiment is an example and other various system configuration examples can be implemented according to various uses and/or purposes.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD-ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, a memory of the CPU, such as a cache memory of the CPU, and the RAM may function as a physical memory or a primary memory of the apparatus, while the HDD may function as a secondary memory of the apparatus.

The present application is based on and claims the benefit of priority of Japanese Priority Application No. 2013-247578, filed Nov. 29, 2013 and Japanese Priority Application No. 2014-201943, filed Sep. 30, 2014, the entire contents of which are hereby incorporated herein by reference.

What is claimed is:

1. A terminal apparatus having a first setting of displaying a portion of information designated by an information processing apparatus and a second setting of being able to display another portion than the portion of the information designated by the information processing apparatus, the terminal apparatus comprising:

a reception part configured to receive transmission information acquired from conversion from the information by the information processing apparatus in such a manner that the transmission information includes a portion of the information to be displayed first and transmission information acquired from conversion from the information by the information processing apparatus in such a manner that the transmission information includes another portion than the portion of the information to be displayed first;

a transmission information storage part configured to store the received transmission information including the portion of the information to be displayed first and the received transmission information including the other portion than the portion of the information to be displayed first; and a display process part configured to display, in a case of the first setting, the portion of the information designated by the information processing apparatus and display, in a case of the second setting, a portion of the information based on an operation performed on the terminal apparatus, wherein the reception part is configured to receive, when switching is performed from the second setting to the first setting, the transmission information corresponding to the portion of the information designated by the information processing apparatus based on whether having already received the transmission information corresponding to the portion of the information designated by the information processing apparatus.

2. The terminal apparatus as claimed in claim 1, wherein the reception part is configured to receive the transmission information corresponding to the portion of the information designated by the information processing apparatus in a case where, when switching is performed from the second setting to the first setting, the terminal apparatus has not received the transmission information corresponding to the portion of the information designated by the information processing apparatus or the transmission information corresponding to the portion of the information designated by the information processing apparatus is not stored by the transmission information storage part even though the terminal apparatus has already received the transmission information corresponding to the portion of the information designated by the information processing apparatus.

3. The terminal apparatus as claimed in claim 1 further comprising:
a transmission information storage control part configured to carry out control such that the reception part receives the transmission information corresponding to a portion of the information as a candidate to be displayed subsequent to a portion of the information which is being displayed by the display process part and the transmission information storage part stores the received transmission information.

4. The terminal apparatus as claimed in claim 1, wherein the display process part is configured to determine, in a case of the first setting, the transmission information corresponding to a portion of the information as a candidate to be displayed subsequent to the portion of the information which is designated by the information processing apparatus and is being displayed by the display process part and determine, in a case of the second setting, the transmission information corresponding to a portion of the information as a candidate to be displayed subsequent to the portion of the information which is being displayed by the display process part based on the operation performed on the terminal apparatus.

5. The terminal apparatus as claimed in claim 1, wherein the display process part is configured to record, in a case of the second setting, the portion of the information designated by the information processing apparatus and, when switching is performed from the second setting to the first setting, read the recorded portion of the information designated by the information processing apparatus and display the portion of the information designated by the information processing apparatus.

6. The terminal apparatus as claimed in claim 5, wherein the display process part is configured to display, when the transmission information corresponding to the portion designated by the information processing apparatus to be displayed by the display process part is stored by the transmission information storage part, the portion of the information by using the transmission information stored by the transmission information storage part, and display, when the transmission information corresponding to the portion designated by the information processing apparatus to be displayed by the display process part is not stored by the transmission information storage part, the portion of the information designated by the information processing apparatus after receiving the transmission information corresponding to the designated portion of the information from the information processing apparatus.

7. The terminal apparatus as claimed in claim 1, wherein the display process part is configured to receive the transmission information based on a transmission method of transmitting the information determined between the terminal apparatus and the information processing apparatus, wherein the transmission method of transmitting the information includes a unit of dividing the information, a data format of the transmission information and a display size of the information.

8. The terminal apparatus as claimed in claim 7, wherein the transmission method of transmitting the information is determined for each terminal apparatus.

9. The terminal apparatus as claimed in claim 1, wherein the first setting is a setting of a synchronous mode of carrying out a synchronous display of information designated by the information processing apparatus and the second setting is a setting of a non-synchronous mode of being able to display other information than the information designated by the information processing apparatus.

10. An information processing system comprising an information processing apparatus and a terminal apparatus connected with the information processing apparatus via a network and having a first setting of displaying a portion of information designated by the information processing apparatus and a second setting of being able to display another portion than the portion of the information designated by the information processing apparatus, the information processing system including:
an information storage part configured to store information;
a conversion part configured to convert the information to transmission information to be transmitted to the terminal apparatus;
a reception part configured to receive, in the terminal apparatus, the transmission information acquired from conversion by the conversion part in such a manner that the transmission information includes a portion of the information to be displayed first and the transmission information acquired from conversion by the conversion part in such a manner that the transmission information includes another portion than the portion of the information to be displayed first;
a transmission information storage part configured to store the received transmission information including the portion of the information to be displayed first and the received transmission information including the other portion than the portion of the information to be displayed first; and
a display process part configured to display, in a case of the first setting, the portion of the information designated by the information processing apparatus and display, in a case of the second setting, a portion of the information based on an operation performed on the terminal apparatus, wherein
the reception part is configured to receive, when switching is performed from the second setting to the first setting, the transmission information corresponding to the portion of the information designated by the information processing apparatus based on whether having already received the transmission information corresponding to the portion of the information designated by the information processing apparatus.

11. An information processing method in a terminal apparatus having a first setting of displaying a portion of information designated by an information processing apparatus and a second setting of being able to display another portion than the portion of the information designated by the information processing apparatus, the information processing method comprising:

receiving transmission information acquired from conversion from the information by the information processing apparatus in such a manner that the transmission information includes a portion of the information to be displayed first and transmission information acquired from conversion from the information by the information processing apparatus in such a manner that the transmission information includes another portion than the portion of the information to be displayed first;

storing the received transmission information including the portion of the information to be displayed first and the received transmission information including the other portion than the portion of the information to be displayed first in an information storage part; and displaying, in a case of the first setting, the portion of the information designated by the information processing apparatus and displaying, in a case of the second setting, a portion of the information based on an operation performed on the terminal apparatus, wherein in the receiving, when switching is performed from the second setting to the first setting, the transmission information corresponding to the portion of the information designated by the information processing apparatus is received based on whether the transmission information corresponding to the portion of the information designated by the information processing apparatus has been already received.

\* \* \* \* \*